Patented May 6, 1941

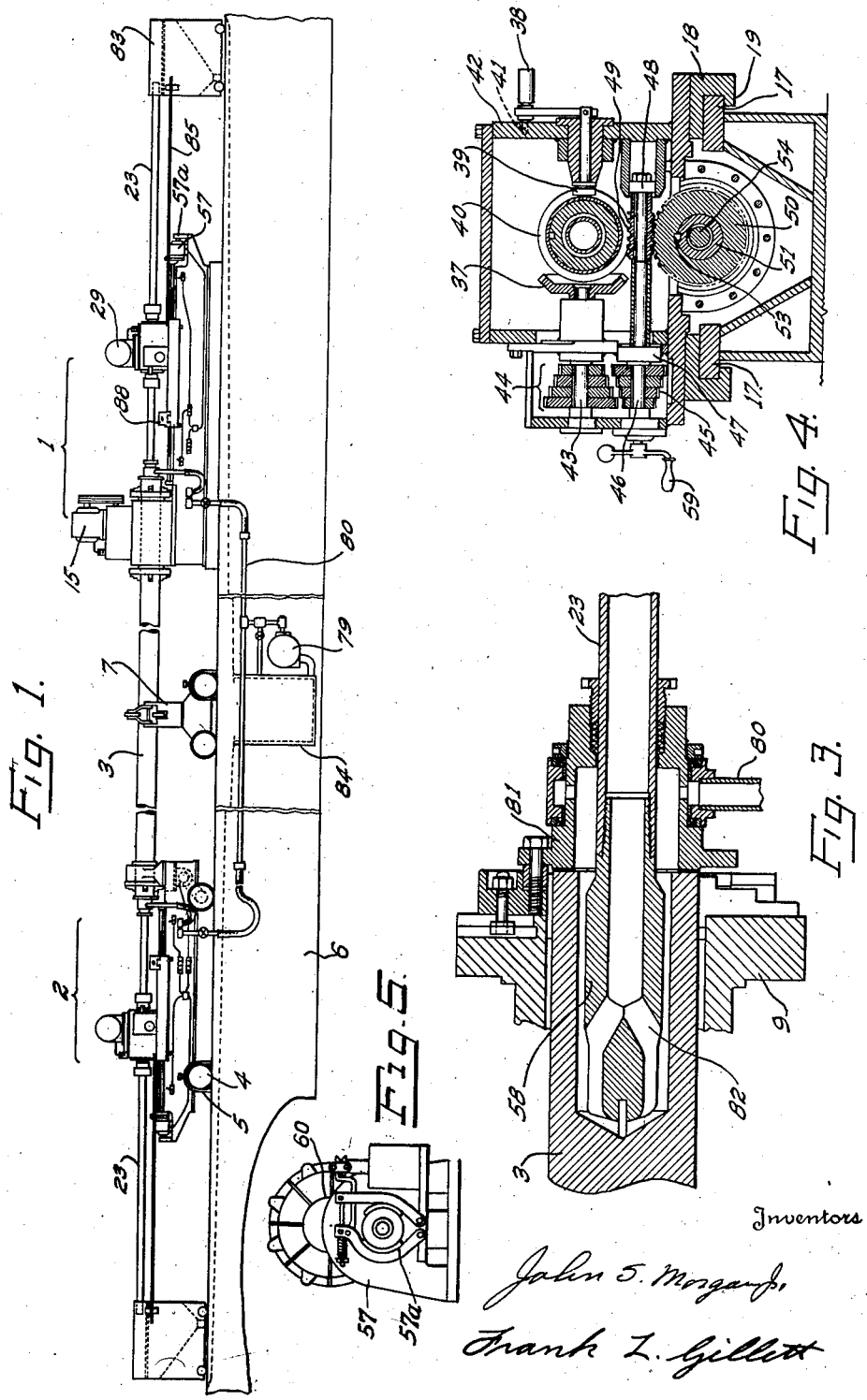

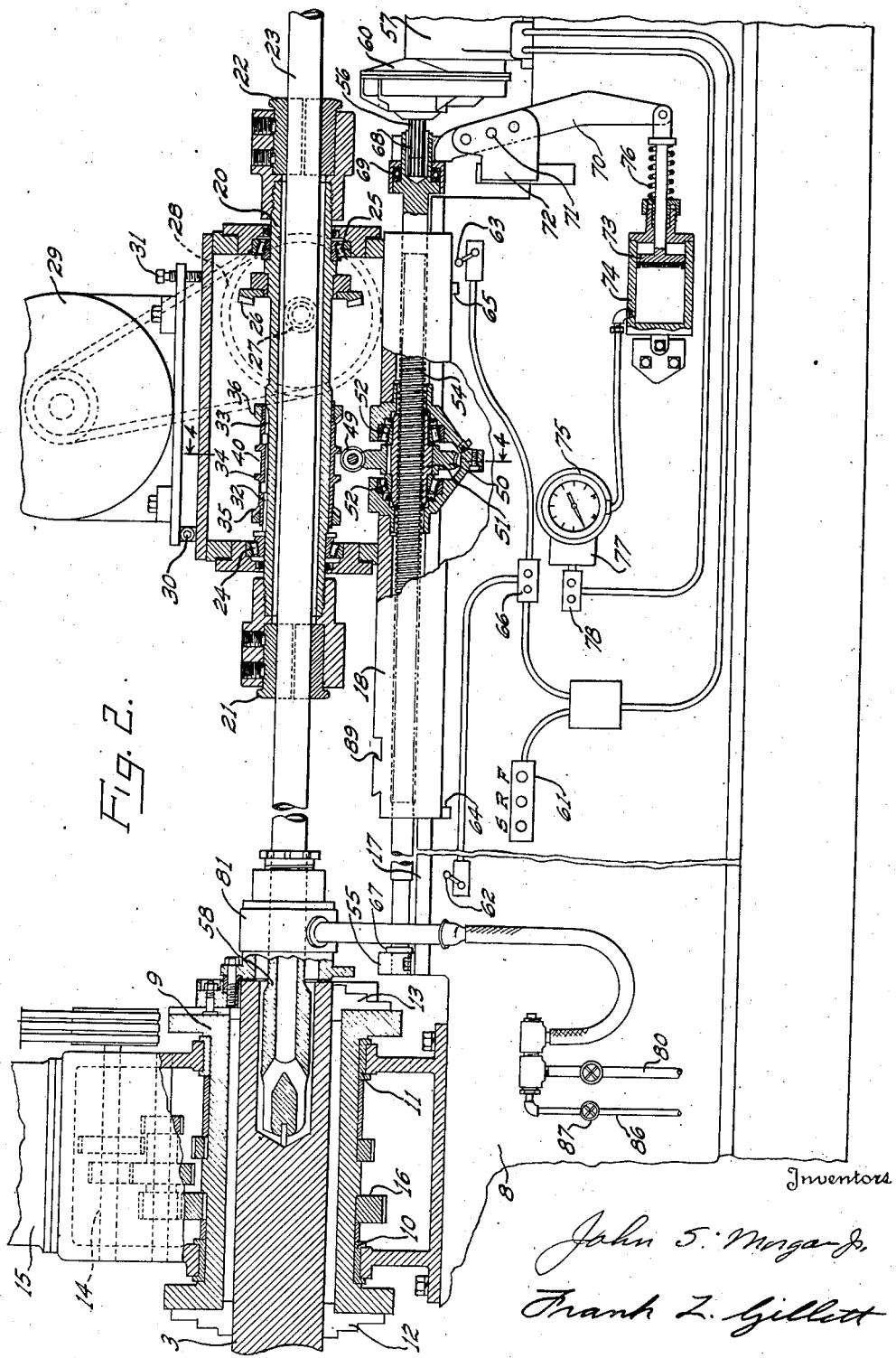

2,240,795

UNITED STATES PATENT OFFICE 2,240,795

DRILLING MACHINE

John S. Morgan, Jr., Los Angeles, and Frank L. Gillett, Inglewood, Calif., assignors to The National Supply Company, Pittsburgh, Pa., a corporation of Pennsylvania Application January 21, 1938, Serial No. 186,122

4 Claims. (Cl. 77—33)

This invention relates to feeding devices for machine tools and is particularly adapted for embodiment in a drilling or boring machine as used for drilling holes longitudinally through members of great length. The drill stems and kellys employed in the art of rotary well drilling are commonly upwards of fifty feet in length and require a small hole, a few inches in diameter, throughout this entire length. A drilling machine embodying our invention has been found particularly applicable for boring the holes for these members.

The principal object of our invention is to provide a feeding device for a drilling machine having great flexibility of operation and in which either one or both of a pair of cooperating feed elements may be actuated to control the advance or retrieval of the tool.

Another object of our invention is to provide a drilling machine having a pair of cooperating feed elements and a thrust indicating mechanism operatively engaging one of the elements to provide a measure of the end thrust reaction thereon, which thrust reaction is incident to the feeding movement of the drill tool.

Other objects and advantages will appear hereinafter.

Figure 1 is a diagrammatic side elevation of a drilling machine embodying our invention and showing the general relation of parts in the entire device.

Figure 2 is a side elevation partly in section of a portion of the device showing the rotary head for the work piece and the feeding device for the drill tool.

Figure 3 is a fragmental sectional view of the rotary driving head and stuffing box shown in Figure 2.

Figure 4 is a sectional end elevation taken on the line 4—4 as shown in Figure 2.

Figure 5 is a detail view showing the auxiliary motor and magnetic brake.

The drilling machine as shown in Figure 1 consists essentially of two drilling units 1 and 2 arranged to operate simultaneously from both ends of a rotating work piece 3. The unit 2 is provided with wheels 4 so that it may be moved relative to the stationary unit 1 in order to accommodate work pieces 3 of different lengths. Clamps 5 are provided to secure the unit 2 to the foundation or sub-structure 6 so that during drilling operations, the units 1 and 2 remain at a fixed distance apart. One or more steady-rests 7 may be provided to rotatably support the work piece 3 intermediate the drilling units.

Only the unit 1 will be described, for as far as this invention is concerned, the unit 2 is substantially a duplicate. Reference to Figure 2 shows a stationary base 8 upon which is mounted a rotary driving head 9. Bearings 10 and 11 support the head 9 upon the base 8 and the customary radially adjustable chuck jaws 12 and 13 secure the work piece 3 to the head 9. A change speed transmission 14 driven from any suitable means, such as a motor 15, is adapted to rotate one of a plurality of gears 16 secured to the head 9, and thereby rotate the work piece 3.

Formed on the base 8 are a pair of horizontal ways 17 upon which a frame or carriage 18 is slidably mounted. The carriage 18 is provided with guides 19 which cooperate with the ways 17 to maintain the carriage 18 and base 8 in proper alignment. Rotatably mounted on the carriage 18 about an axis parallel to the ways 17 is a driving sleeve 20 which is provided with drive clamps 21 and 22 to grip a drill rod 23. The drill rod 23 preferably extends through the driving sleeve 20 and is gripped at each end thereof by the clamps 21 and 22. Bearings 24 and 25 rotatably support the driving sleeve 20 on the carriage 18. A bevel gear 26 is secured on the sleeve 20 and is adapted to be driven by a bevel pinion 27, shown in dotted lines on Figure 2. The bevel pinion 27, in turn, is driven from a pulley 28 which is belt connected to a motor 29 supported on the carriage 18. The motor 29 may be mounted on pivots 30 and adjusting screws 31 to provide for adjustment of belt tension.

Splined to the driving sleeve 20, as by keys 32 and 33, is a drive collar 34 which carries opposed bevel gears 35 and 36 at its ends. The collar 34 is adapted to slide lengthwise for a limited distance upon the sleeve 20 to mesh one or the other of the gears 35 or 36 with the mating bevel gear 37 (see Figure 4). A shifter crank 38 operates a cam 39 in the groove 40 to hold the collar 34 in the desired position. A releasable pin 41 in the crank handle cooperates with any one of three holes in a side wall 42 of the carriage 18, to mesh the gear 37 with either one of the gears 35 or 36 or to maintain the collar 34 in neutral position. It should be noted that the gears 35 and 36 drive the gear 37 in opposite directions.

The countershaft 43 carries the gear 37 and is provided with a group of change speed gears 44 which are adapted to cooperate with a similar group of gears 45 mounted on the worm shaft 46. An idler pinion (not shown) is used in the conventional manner to form a driving connection between cooperating gears in groups 44 and 45. Carried on the worm shaft 46 intermediate the supporting bearings 47 and 48 is the worm gear or pinion 49 which is adapted to drive the worm wheen 50. The pinion 49 and worm wheel 50 are preferably of the non-reversing type wherein the pinion may drive the worm wheel but the worm wheel cannot drive the pinion. A feed nut 51 is rotatably supported in bearings 52 mounted on the carriage 18. The worm wheel 50 is mounted on the feed nut 51 between the bearings 52 and is held against relative rotation by means of a key 53. A feed screw 54 is supported at one end in a bearing 55 carried on the base 8 and at the other end by a power take-off shaft 56 of an auxiliary drive motor 57, described below. This feed screw 54 is normally stationary during drilling operations, so that rotation of the nut 51 by means of the motor 29 and transmission connections to the worm wheel 50 results in longitudinal movement of the carriage 18 upon the ways 17. It is apparent therefore, that the motor 29 performs the dual function of rotating the drill rod 23 and also feeding it relative to the work piece 3. Shifting of the collar 34 results in reversal of feed only, the direction of rotation remaining unchanged. For starting the tool 58 into the work piece 3, or if desired for any other reason, feeding of the drill rod 23 may be manually accomplished by means of the feed-crank 59.

The auxiliary motor 57 is mounted on the base 8, and as illustrated in the drawings, is provided with a speed reduction unit 60 from which the power take-off shaft 56 extends. The auxiliary motor 57 is further provided with a magnetic brake 57a of the usual construction, which acts to prevent rotation when the motor 57 is not operating. In this way the feed screw 54 is normally held against rotary movement, so that rotation of the feed nut 51 results in longitudinal movement of the carriage 18, and does not tend to turn to feed screw 54.

However, if it is desired quickly to retrieve the drill tool 23 from the work piece 3, or to advance it at a greater rate of feed, the motor 57 may be started by pressing the proper button in the control switch 61. ("S," "R," and "F" indicate "stop," "reverse," and "forward," respectively.) The motor 57 rotates the feed screw 54 at a relatively high rate of speed, quickly retrieving or advancing the drill tool 23. Since the feed screw 54 revolves at a greater rate of speed than the feed nut 51, the rotation of the motor 57 governs the direction of movement of the carriage 18, irrespective of whether the motor 29 is rotating the feed nut 51 or not. It will be obvious that if both motors 29 and 57 operate simultaneously, a differential rate of feed or retrieval will be obtained.

In order to prevent over-travel of the carriage 18 upon the ways 17, automatic stop switches 62 and 63 are provided on the base 8. Lugs 64 and 65 on the carriage 18 are adapted to trip these switches when the carriage reaches the end of its normal movement in either direction, and hence prevent possible injury to the mechanism. The switch 62 operates to stop the feed motor 29, and the switch 63 is similarly connected to stop the auxiliary motor 57. This arrangement is preferred, since in the particular machine illustrated, the carriage 18 is normally advanced by the motor 29 and retrieved by the motor 57. The switch box 66 is provided for re-setting of the switches 62 and 63.

It is often necessary or desirable for the operator to know what pressure exists between the cutting tool 58 and the work piece 3 in order that the drilling may proceed at the most efficient rate. A novel device for obtaining a reliable indication of this pressure is shown clearly in Figure 2. The feed screw 54 is held against longitudinal inward movement at its forward end, where the thrust collar 67 engages the side of the bearing box 55. The other end of the feed screw 54 is supported in a spline connection 68 which cannot absorb end-thrust. A rotatable thrust collar 69 is mounted adjacent the spline connection 68 and this collar 69 abuts the end of a lever 70 pivoted at 71 on a bracket 72 on the base 8. The other end of this lever 70 is pivotally connected to the piston 73 which works in a closed fluid cylinder 74 carried on the base 8. A pressure gage 75 is connected to the cylinder 74 to indicate the fluid pressure therein. The end-thrust due to pressure on the cutting tool 58 is taken through the carriage 18 to the feed nut 51, and from the feed nut 51 to the feed screw 54. This reactive end-thrust on the feed screw 54 is measured by means of the collar 69, pivoted lever 70, piston 73 and cylinder 74, and gage 75.

A coil spring 76 may be provided between the cylinder 74 and piston 73 as shown to hold the parts in operative relation. The location of the pivot 71 can be varied, as shown, to provide for various drill sizes, rates of rotation and feed, etc. Another feature of this pressure indicating device is that it may be utilized automatically to reverse the feed when the pressure becomes excessive. An electrical switch 77, which may be of common construction, operates in conjunction with the gage 75 and automatically starts the auxiliary motor 57, upon the gage pressure reaching a predetermined maximum, and thereby reverses the direction of feed. The switch box 78 is provided for re-setting of the electric switch 77.

The drill rod 23 is preferably of a hollow construction so that the customary cutting fluid may be supplied to the drilling tool 58. In the construction illustrated, this cutting fluid is pumped by the pump 79 up through the conduit 80 and into the stuffing box 81 through which the drill rod 23 operates. This fluid cools the drilling tool 58 and removes the cuttings, carrying them back through the holes 82 in the tool 58 and through the inside of the drill rod 23 to the buggy 83, where the cuttings are collected. The fluid then drains back to the sump 84 and into the pump 79 to be re-circulated. The buggy 83 is mounted on wheels and is connected by a tie-rod 85 to the carriage 18, so that the buggy 83 moves with the drill rod 23 as the latter is fed into the work piece 3. A conduit 86 having a valve 87 is connected to the inlet conduit 80, and can be used to supply another fluid, for example compressed air, to the drilling tool 58 either independently or in conjunction with the cutting fluid.

Since the drilling units 1 and 2 are substantially duplicates, the complete operation of our device will be understood from a description of the operation of the unit 1 only. The drilling unit 2 is secured in the proper position to accommodate the work piece 3 through which a hole is to be drilled. One or more steady-rests 7 are arranged between the drilling units 1 and 2, and are clamped in position to act as rotatable supports. Rotation is imparted to the work piece 3 by means of motor 15 and chuck jaws 12 and 13 on the rotary head 9. The end of the work piece 3 is faced off and the hole started by means of a tool (not shown) carried on the holder 88 mounted on the cross-ways 89. The drill tool 58 is then positioned in this hole and the stuffing box assembly 81 bolted into position.

The carriage 18 is moved to the end of its travel away from the rotary head 9, and the drill rod 23 is then secured relative to the drive sleeve 20 by means of the clamps 21, 22. The fluid pump 79 and the motor 29 are started, and when circulation has been established, the tool 58 may be fed into the work piece 3 by means of the hand crank 59. When the hole has progressed to a sufficient depth, the idler pinion (not shown) is placed in operative position between one gear in the group 44 and one in the group 45, and the shifter crank 38 may be moved to cause the motor 29 to feed the tool 58 into the work piece 3. During this normal drilling operation the auxiliary motor 57 remains at rest, thus holding the feed screw 54 from rotation.

Should the pressure on the drill tool 58 become excessive, either because of a high rate of feed, or dull cutting edges, or for any other reason, the electric switch 77 automatically closes the circuit which starts the motor 57, and the tool 58 is quickly retrieved, whether the motor 29 is stopped or not. Moreover, if the operator observes from the reading of the gage 75 that the pressure is either too great or too small, he may press the button marked "R" and reverse the feed to retrieve the tool 58 in a manner similar to the automatic reverse. If the drill tool 58 should break, the pressure falls off sharply and then begins to build up steadily. If the operator observes this sudden fall in pressure he can reverse the feed before the automatic retrieval takes effect.

Accidental over-travel of the carriage 18 upon the ways 17 is prevented by the automatic switches 62 and 63, as set out above. In normal operation, when the carriage 18 reaches the end of its forward travel upon the ways 17, the motor 29 is stopped and the clamps 21 and 22 are released from the drill rod 23. The carriage 18 is then moved back to its starting point, preferably by operating the auxiliary motor 57, and the clamps 21 and 22 are secured to the drill rod 17 in a new position. If necessary, the drill rod 23 may be lengthened by adding sections to its outer end. When the two cutting tools 58 approach each other near the middle of the work piece 3, one is stopped and retrieved, while the other is allowed to "break through" to complete the hole.

The relative high rate of feed provided by the auxiliary motor 57 may be utilized for reaming or other operations, either independently or in conjunction with the slower feed provided by the motor 29.

Having fully described our invention, it is to be understood that we do not wish to be limited to the details herein set forth, but our invention is of the full scope of the appended claims.

We claim:

1. In a device for controlling the feed of a drill tool, having a stationary base, a carriage slidably mounted thereon, and a drill tool mounted on said carriage, the combination of a nut rotatably supported on said carriage and held against longitudinal movement relative thereto, a screw rotatably supported on said base and adapted to cooperate with said nut, drive means supported on said carriage and adapted to rotate the nut upon the screw to advance the carriage relative to said base, auxiliary drive means on said base operatively associated with said feed screw, a control switch for said auxiliary drive means, thrust measuring means associated with said feed screw adapted to measure the thrust reaction imparted by said feed nut, said thrust measuring means being adapted to actuate said control switch upon the reaction thrust reaching a predetermined maximum, such actuation of the control switch acting automatically to cause the auxiliary drive means to rotate the screw within the nut to stop the forward advance of the carriage.

2. In a device for controlling the feed of a drill tool, having a stationary base, a carriage slidably mounted thereon, and a drill tool mounted on said carriage, the combination of a nut rotatably supported on said carriage and held against longitudinal movement relative thereto, a screw rotatably mounted on said base and adapted to cooperate with said nut, a drive motor supported on said carriage and adapted to cause relative rotation between the nut and the screw to advance the carriage upon the base, an auxiliary drive motor supported on the base and adapted to rotate said screw, a thrust bearing on said base adapted to prevent longitudinal movement of the screw under influence of the thrust reaction imparted by said nut, and control means for said auxiliary motor responsive to the degree of thrust received by said thrust bearing.

3. In a device of the class described, the combination of a base, a carriage guided for longitudinal movement on said base, feed means for said carriage including a feed screw mounted on said base and a cooperating feed nut rotatably mounted on said carriage, drive means on said carriage adapted to rotate the feed nut upon the relatively stationary feed screw to advance the carriage upon the base, means associated with the feed screw and adapted to resist the thrust reaction imparted to the feed screw by the feed nut, said means including a fluid-body under a pressure proportional to said reaction thrust, and gage means associated with said fluid body and adapted to provide a measure of said reaction thrust.

4. In a device of the class described, the combination of a base, a carriage guided for longitudinal movement on said base, feed means for said carriage including a feed screw mounted on said base and a cooperating feed nut rotatably mounted on said carriage, drive means on said carriage adapted to rotate the feed nut upon the relatively stationary feed screw to advance the carriage upon the base, means associated with the feed screw and adapted to resist the thrust reaction imparted to the feed screw by the feed nut, said means including a fluid-body under a pressure proportional to said reaction thrust, and means responsive to variations in said fluid pressure adapted to change the rate of relative rotation between the feed screw and feed nut.

JOHN S. MORGAN, Jr.
FRANK L. GILLETT.